United States Patent Office 3,806,482
Patented Apr. 23, 1974

3,806,482
COMPOSITIONS FOR RENDERING FIBROUS MATERIALS HYDROPHOBIC
Joseph W. Creely, 245 D St., Middlesex, N.J. 08846
No Drawing. Continuation-in-part of application Ser. No. 218,585, Sept. 16, 1971, which is a continuation-in-part of Ser. No. 649,860, June 29, 1967, which in turn is a continuation-in-part of Ser. No. 393,408, Aug. 31, 1964, all now abandoned. This application Oct. 19, 1972, Ser. No. 298,904
Int. Cl. C08f 45/52
U.S. Cl. 260—28.5 A
8 Claims

ABSTRACT OF THE DISCLOSURE

A composition of the class containing metallic compounds for rendering fibrous materials water-repellent, having improved stability in the presence of a moisture-laden atmosphere, which contains an organic solvent, a wax, a $C_{5-15}$ monocarboxylic acid of the "neo" type, an organo-metallic compound, and a light colored hydrocarbon resin. The composition is particularly useful in the dry-cleaning industry for the treatment of garments and the like.

CROSS-REFERENCES TO RELATED APPLICATIONS

This is a continuation of application Ser. No. 218,585, filed Sept. 16, 1971, now abandoned, which is a continuation-in-part of application Ser. No. 649,860, filed June 29, 1967, now abandoned, which in turn is a continuation-in-part of application Ser. No. 393,408, filed Aug. 31, 1964, and now abandoned.

The present invention relates to compositions for rendering fibrous materials water-repellent. More particularly, the present invention relates to water-repellent compositions having improved stability in the presence of moisture-laden atmospheres such as are likely to be encountered in commercial dry-cleaning establishments.

It is common practice in the dry-cleaning industry to treat rain garments and similar apparel, which are manufactured from normally hydrophilic fibrous materials of either natural or synthetic origin, with chemical compositions to improve their water-repellency. Such treatment is necessary because the garments, although substantially water-repellent when new, are restored to their natural hydrophilic state by the action of the various solvents used in the ordinary dry-cleaning processes. The prior art contains many examples of compositions which will impart water-repellency to fibrous materials, but, in general, such widely different compositions tend to be hygroscopic and this leads to a serious problem of a practical nature. In general, the available compositions contain ingredients which precipitate in the presence of water and this is particularly true of compositions containing metalllic ingredients. When such compositions are employed in an atmosphere having a high relative humidity, they will absorb moisture from the atmosphere and this, in turn, leads to the formation of a solid precipitate in the compositions. When a garment which is to be made water-repellent is immersed in such moisture-contaminated compositions, the result will be a badly-streaked unsightly garment which makes it necessary to return the garment to the original dry-cleaning process, thus adding substantially to the cost of the overall operation.

A water-repellent composition containing metallic compounds has now been found which exhibits improved stability in the presence of a moisture-laden atmosphere. In brief, and as more particularly described hereinafter, the present invention relates to water-repellent compositions which comprise an organic solvent, a wax, an organic monocarboxylic acid of the "neo" type having from 5 to about 15 carbon atoms, an organo-metallic compound and a light colored hydrocarbon resin. In some instances, it is desirable to add a small amount of a fluorescent dye or brightener to the compositions in order to improve their appearance. Any suitable dye or brightener can be used for this purpose, but since the effectiveness of the composition as an agent in imparting water-repellency to fabric does not depend on the use of such dyes and brighteners, a further description of them is unnecessary to an understanding of the present invention.

As the organic solvent which is employed in the compositions of this invention, low-boiling hydrocarbons or chlorinated hydrocarbons such as naphtha, benzene, carbon tetrachloride, trichloroethylene, perchloroethylene or mixtures thereof are preferred. A particularly suitable solvent is the so-called "Stoddard" solvent, which is a petroleum-drived naphtha commonly employed in dry-cleaning operations. A description of the properties of Stoddard solvent is found in Rose et al., The Condensed Chemical Dictionary, p. 1077 (6th ed., 1961), published by Reinhold Publishing Corp., New York, N.Y. The compositions of this invention should comprise an amount of organic solvent of from about 40% to about 75% by weight of the composition.

Any paraffin wax having a melting point in the range of from about 110° to about 140° F. can be employed in the compositions of this invention. A particularly suitable wax for the purposes of this invention is a petroleum-derived paraffin wax having a melting point of from about 125° to about 130° F. In general, the composition should contain an amount of wax of from about 10% to about 30% by weight based on the composition.

The organic acid which is employed in the compositions of the present invention is a monocarboxylic acid of the "neo" type containing from 5 to about 15 carbon atoms. These so-called "neo-acids" are compounds having a completely substituted α-carbon atom (i.e., the carbon atom adjacent to the carboxyl radical), and thus named because of their structural resemblance to neopentane (2,2-dimethyl propane). One of the predominant characteristics of the neo acids in comparison to the normal monocarboxylic acids is their resistance to hydrolysis because of the steric hindrance of the alpha substituents. It has been found that the use of these neo acids instead of the normal carboxylic acids helps to prevent the formation of undesirable precipitates in the compositions of this invention when employed in a moisture-saturated atmosphere.

These neo acids can be synthesized by various known methods, for example, the catalyzed reaction of olefins and CO as described in U.S. Pats. 1,924,766; 2,419,131; 2,831,877; 3,036,124; 3,053,869; and 3,167,585; the acid catalyzed hydrolysis of oxazolines as described in U.S. Pat. 3,466,309; and the free radical initiated reaction of ethylene and isobutyric acid as described by Coffman et al., 72 J. Am. Chem. Soc'y., pp. 3392–3 (1950).

A preferred neo acid for use in the present invention is neo-decanoic acid; a particularly suitable example of this acid is reported by the manufacturer to have an acid number (mg./KOH/g.) of 311.5 (326 theoretical), a saponification number (mg./KOH/g.) of 335.9, a refractive index ($n_D^{20}$) of 1.4388, a specific gravity of 0.911 and a viscosity (SSU/100° F.) of 84.8. It is a colorless liquid.

In general, the compositions of the present invention should comprise an amount of neo acid of from about 0.5% to about 5% by weight of the composition. It will be understood that individual neo acids as well as mixtures of these acids are contemplated within the scope of this invention. It will also be understood that in the usual commercial synthesis of these acids, small amounts of other substances may be present, and the instant invention includes the use of such commercial mixtures so long as these other substances do not adversely affect the basic and novel characteristics of the compositions described herein. It will be further understood that although specific methods of preparing neo acids are described herein, the neo acids employed in this invention are not limited to any particular method of preparation.

As the organo-metallic compound employed in the compositions of this invention, organic compounds of aluminum, zirconium and titanium alkoxides can be used, but the preferred compound is aluminum butoxide (aluminum tri-sec butoxide). It is also preferred that at least a part of the aluminum butoxide is in a chelated form, as, for example, aluminum chelate BEA-1, which is an aluminum sec-butoxide which has been chelated with ethyl ocetoacetate. In general, the compositions should comprise an amount of the organo-metallic compound in the range of from about 1% to about 20% by weight of the composition. In the case of the organo-aluminum compound mentioned above, the preferred form is one in which about half of the total amount of aluminum butoxide is present in the chelated form.

The hydrocarbon resin which is employed in the compositions of the present invention is a light colored resin having a color less than 18 on the Gardner color scale, and soluble in hydrocarbon solvents. Preferably, a water-white resin having a Gardner color less than 5 and, most preferably, less than about 1 is used. In general, the compositions of this invention should comprise an amount of the hydrocarbon resin of from about 1% to about 25% by weight of the composition.

Particularly suitable examples of hydrocarbon resins for use in the present invention are the hydrogenated polydiene hydrocarbon resins such as described, for example, in the Encyclopedia of Chem. Tech., First Supp. vol. 1, pp. 659–67 (1957), edited by Kirk and Othmer, published by Interscience Publishers, New York. These resins can be formed, for example, by polymerizing a cut of unsaturated hydrocarbons that is essentially free of aromatics and obtained from the deep cracking of petroleum. It is known that in the manufacture of gasoline, the presence of dienes is undesirable since these substances lead to the formation of gums and residues. The gasoline is separated from these dienes by distillation, stripping and the like, and the diene residue can be catalytically polymerized such as by the use of acid catalysts, for example, sulfuric acid and Friedel-Crafts type catalysts as described, for example, in U.S. Pat. 3,117,114.

It is also known that copolymerization with monoolefins provides a means of reducing the unsaturation of diene polymers and generally produces polydiene resins of lower density than monopolymerization with only diene compounds. Such polydiene copolymers are disclosed, for example, in U.S. Pat. 2,507,100, which describes copolymerization of mixtures of dienes (such as 30% to 80% butadiene) and monoolefins (such as 70% to 20% diisobutylene), and Canadian Patent 531,202, which describes copolymerization of mixtures of diene and monoolefin hydrocarbons having predominantly 5 to 7 carbon atoms, containing at least 10% conjugated dienes and having a light color less than 18 on the Gardner color scale.

Other suitable examples of the hydrocarbon resins which can be used in the practice of this invention are the cyclic polyterpene and beta pinene resins such as described, for example, by Powers and Pflum, Ind. & Eng. Chem., vol. 53, No. 5, pp. 371–74 (1961) and in U.S. Pats. 3,354,132 and 3,467,632, and the copolymers of vinyl toluene and α-methyl styrene such as described, for example, in U.S. Pat. 3,000,868.

Commercially available examples of the foregoing hydrocarbon resins are the "Piccopale," "Piccolyte" and "Piccotex" resins and a resin designated as "Resin XP22," all obtained from the Pennsylvania Industrial Chemical Corp., Clairton, Pa. These hydrocarbon resins have an essentially water-white color of less than 1 on the Gardner color scale, are soluble in hydrocarbon solvents and, thereby particularly well suited for use in the compositions of this invention.

The halogenated hydrocarbon which is preferably ememployed in the compositions of this invention can be methylene chloride or one of the "Freons," e.g., monofluoro trichloromethane, and the compound can be present in amounts of from about 3% to about 15% by weight of the composition.

In general, the method of application of the compositions of this invention to the garments is not critical and any of the conventional methods can be employed. For example, the garment can be first dry-cleaned in the usual manner and then dipped in a solution containing the compositions of this invention. Next the garment is dried and pressed. It is unnecessary to employ the compositions of this invention full-strength and they can be and preferably are diluted prior to use with conventional dry-cleaning solvents, as, for example, Stoddard solvent. Dilutions of one part by volume of the compositions of this invention with as much as about twenty parts by volume of solvent are entirely acceptable and provide good results.

EXAMPLE 1

In order to provide an illustrative embodiment of the invention, a composition is prepared as follows:

| Components: | Percent by weight |
|---|---|
| Paraffin wax (M.P. 125–130° F.) | 20.0 |
| Stoddard solvent | 53.5 |
| Neo-decanoic acid (as above described) | 1.5 |
| Aluminum chelate BEA-1 | 4.0 |
| Aluminum tri-sec butoxide | 3.0 |
| Methylene chloride | 8.0 |
| Hydrogenated polydiene hydrocarbon resin (water-white, solid resin, bromine No. 4–5) [1] | 10.0 |
| | 100.0 |

[1] At least 10% butadiene copolymerized with butene. Sold under the trademark "Piccopale."

In order to test the composition, one part of the composition is diluted with five parts by volume of Stoddard solvent. The resulting solution is tested in accordance with a modified test method designated by the American Society for Testing and Materials as D583–63, which is a standard test method for measuring the water-repellent efficacy of solutions applied to fabrics, particularly plain woven fabrics. In this test twenty clean poplin cloths are impregnated with the above-identified solution and extracted to a 50% wet pick-up, dried and pressed. They are then air-dried overnight before testing. After the test the specimens are evaluated by comparing the wet batch of the test cloths with pictures on a standard chart. According to this evaluation the composition of this invention has a superior rating.

As a further test of the properties of the composition of this invention the same solution used in the modified ASTM (D583–63) test is placed in a flat container and covered with a towel which is maintained in a wet state for fourteen days. At the end of this period the solution shows no sign of any precipitation, indicating its stability in the presence of a moisture-saturated atmosphere. By way of comparison, use of a similar composition except that normal decanoic acid is used in place of neo-decanoic acid results in rapid formation of a precipitate in a water-repellent bath within less than one day.

EXAMPLE 2

In order to provide further illustrative embodiments of the invention, compositions are prepared as follows:

| Components: | Percent by weight |
|---|---|
| Shell Wax 100 (paraffin wax) | 15.00 |
| Atlantic Solvent 57 (mineral spirits) | 48.86 |
| Calcofluor White RW | 0.04 |
| Aluminum Chelate BEA-1 | 4.00 |
| Aluminum secondary butoxide | 3.00 |
| Neo-decanoic acid | 1.50 |
| Piccotex 100 (50% in mineral spirits) copolymer of vinyl toluene and alpha methyl styrene | 19.60 |
| Methylene chloride | 8.00 |
| | 100.00 |

| Components: | Percent by weight |
|---|---|
| Shell Wax 100 (paraffin wax) | 15.00 |
| Atlantic Solvent 57 (mineral spirits) | 65.46 |
| Calcofluor White RW | 0.04 |
| Aluminum Chelate BEA-1 | 4.00 |
| Aluminum secondary butoxide | 3.00 |
| Neo-decanoic acid | 1.50 |
| Resin XP 22 (Picco resin)[1] | 3.00 |
| Methylene chloride | 8.00 |
| | 100.00 |

[1] Water-white hydrocarbon resin having a Gardner color of 1, soluble in hydrocarbon solvents, softening point of 180° C., acid No. 1, saponification No. 1, specific gravity at 25° C. of 0.96, refractive index at 25° C. of 1.54, flash point of 570° F. and fire point of 660° F.

The above compositions provide excellent water-repellent properties to fabrics treated according to the method described in Example 1, above, and exhibit stability in a moisture-laden atmosphere substantially similar to the stability set forth in said example.

It will be understood that the specific examples of the compositions of the present invention set forth above are given merely by way of illustration and not limitation and that many modifications and variations of the compositions of this invention can be made without departing from the spirit and scope of the invention. Accordingly, this application for Letters Patent is intended to cover all such modifications and variations as would reasonably fall within the scope of the appended claims.

What is claimed is:

1. A composition for rendering normally fibrous materials hydrophobic consisting essentially of from about 40% to about 75% by weight of organic solvent, from about 10% to about 30% by weight of paraffin wax having a melting point of from about 110° to about 140° F., from about 0.5% to about 5% by weight of a saturated organic monocarboxylic neo acid having from about 10 to about 15 carbon atoms, from about 1% to about 20% by weight of organo-metallic compound selected from the group consisting of aluminum, zirconium and titanium alkoxides, and from about 1% to about 25% by weight of light colored hydrocarbon resin having a Gardner color less than 18.

2. The composition of claim 1 in which the organic solvent is petroleum naphtha, the monocarboxylic acid is neo-decanoic acid, the organo-metallic compound is aluminum butoxide, a part of which is in a chelated form, and in which the hydrocarbon resin is a water-white resin having a Gardner color less than 5.

3. The composition of claim 1 containing additionally from about 3% to about 15% by weight of the composition of halogenated hydrocarbon.

4. The composition of claim 2 containing additionally from about 3% to about 15% by weight of the composition of methylene chloride.

5. A method of improving the stability of a composition for imparting water-repellency to fabrics in a moisture-saturated atmosphere comprising admixing from about 0.5% to about 5% by weight of saturated organic monocarboxylic neo acid having from about 10 to about 15 carbon atoms with from about 40% to about 75% by weight of organic solvent, from about 10% to about 30% by weight of paraffin wax having a melting point of from about 110° to about 140° F., from about 1% to about 20% by weight of organo-metallic compound selected from the group consisting of aluminum, zirconium and titanium alkoxides, and from about 1% to about 25% by weight of light colored hydrocarbon resin having a Gardner color less than 18.

6. The method of claim 5 in which the organic solvent is petroleum naphtha, the monocarboxylic acid is neo-decanoic acid, the organo-metallic compound is aluminum butoxide, a part of which is in a chelated form, and in which the hydrocarbon resin is a water-white resin having a Gardner color less than 5.

7. The method of claim 5 in which from about 3% to about 15% by weight of the composition of halogenated hydrocarbon is additionally admixed in the composition.

8. The method of claim 6 in which from about 3% to about 15% by weight of the composition of methylene chloride is additionally admixed in the composition.

References Cited

UNITED STATES PATENTS

| | | | |
|---|---|---|---|
| 2,801,190 | 7/1957 | Orthner et al. | 117—135.5 |
| 3,067,155 | 12/1962 | Michaels | 260—28.5 (a) |
| 3,214,450 | 12/1965 | Michaels | 117—135.5 |

OTHER REFERENCES

Kirk et al.: Encyclopedia of Chem. Tech.; First Supp., vol. I; Intersciences Pub., New York, 1957, pp. 665–666, Sci. Lib.

LEWIS T. JACOBS, Primary Examiner

U.S. Cl. X.R.

260—33.6 R, 33.8 R

UNITED STATES PATENT OFFICE
CERTIFICATE OF CORRECTION

Patent No. 3,806,482          Dated April 23, 1974

Inventor(s) Joseph W. Creely

It is certified that error appears in the above-identified patent and that said Letters Patent are hereby corrected as shown below:

Column 1, line 4, "Continuation-in-part" to read --- Continuation ---.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*